(12) United States Patent
Schuyten

(10) Patent No.: US 7,314,224 B2
(45) Date of Patent: Jan. 1, 2008

(54) AUTOMATIC ORIENTATION OF TOP MOUNT

(75) Inventor: Kris Schuyten, Sint-Truiden (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 246 days.

(21) Appl. No.: 11/222,343

(22) Filed: Sep. 8, 2005

(65) Prior Publication Data

US 2006/0049592 A1    Mar. 9, 2006

Related U.S. Application Data

(60) Provisional application No. 60/608,556, filed on Sep. 9, 2004.

(51) Int. Cl.
*B60G 15/00* (2006.01)

(52) U.S. Cl. .................... 280/124.147; 280/86.75; 280/86.752; 280/124.155

(58) Field of Classification Search ......... 280/124.147, 280/124.155, 86.75, 86.752, 86.754; 267/220, 267/221
See application file for complete search history.

(56) References Cited

U.S. PATENT DOCUMENTS

| | | | | |
|---|---|---|---|---|
| 4,200,307 A | * | 4/1980 | Szabo ................ | 280/124.155 |
| 4,248,454 A | * | 2/1981 | Cotter et al. .......... | 280/124.155 |
| 5,261,650 A | * | 11/1993 | Hein .......................... | 267/220 |
| 5,454,585 A | | 10/1995 | Dronen et al. | |
| 5,788,262 A | * | 8/1998 | Dazy et al. ........... | 280/124.155 |
| 6,260,835 B1 | * | 7/2001 | Angles et al. .............. | 267/220 |
| 6,328,321 B1 | | 12/2001 | Nolan | |
| 6,382,645 B1 | * | 5/2002 | Gravelle et al. ....... | 280/86.754 |
| 6,592,112 B2 | | 7/2003 | Bishop et al. | |
| 6,883,790 B2 | | 4/2005 | Bottene et al. | |
| 7,185,746 B2 | * | 3/2007 | Nakajima et al. ...... | 188/321.11 |
| 7,204,517 B2 | * | 4/2007 | Gatley et al. ............... | 280/779 |
| 2007/0170684 A1 | * | 7/2007 | Ohkita et al. ......... | 280/124.147 |

* cited by examiner

*Primary Examiner*—Paul N. Dickson
*Assistant Examiner*—Joseph Rocca
(74) *Attorney, Agent, or Firm*—Harness, Dickey & Pierce, PLC

(57) ABSTRACT

The top mount of a strut assembly is capable of being orientated in various positions to accommodate various locations in a vehicle. An orientation device includes a top mount fixture which engages the top mount of the strut assembly. The top mount fixture is positioned within upper tooling and the top mount and top mount fixture are rotated in a first direction until a blocking stop on the upper tooling is engaged. The top mount and the top mount fixture are rotated in the opposite direction until a position stop on the upper tooling is engaged to properly orientate the top mount. Additional position stops can be added to the upper tooling to define additional orientations for the top mount.

14 Claims, 3 Drawing Sheets

AUTOMATIC ORIENTATION OF TOP MOUNT

FIELD OF THE INVENTION

The present invention relates to a McPherson strut assembly for a motor vehicle. More particularly, the present invention relates to the orientation of the top mount of the McPherson strut assembly which allows for the use of common components on both sides of the vehicle.

BACKGROUND OF THE INVENTION

Strut-type suspension systems are well known in the motor vehicle industry. A telescopic strut normally incorporating a hydraulic damper is used as one of the locating members for the wheel of the motor vehicle. The most common form of a strut-type suspension is the McPherson strut suspension system. The McPherson strut assembly includes a coil spring located concentrically around the telescopic strut which is the shock absorber. The upper end of the McPherson strut assembly includes an upper mounting assembly which is mounted in a tower formed by the vehicle body at a position above the wheel arch of the vehicle.

The upper mounting assembly typically includes a rebound bumper protected by a dirt shield, an upper spring seat for properly positioning the coil spring of the McPherson strut assembly, a bearing which allows rotation of the piston rod with respect to a top mount which includes bolts which are utilized to secure the upper mounting assembly to the tower formed by the vehicle body.

As a result of the quest for standardization and the associated cost savings, it is desirable to design symmetrical parts. In the case of the upper mounting assembly, the rebound bumper, the dirt shield, the upper spring seat and the bearing are typically symmetrical components which can be used on both the right and left sides of the vehicle. The top mount, while being similar in design for the right and left sides of the vehicle, it is not a symmetrical component. While the top mount is not a symmetrical component, the identical component may be able to be used on the right and left hand sides of the vehicle if the orientation of the top mount can be specifically set to a first orientation when it is positioned on the right side of the vehicle and specifically set to a second orientation when it is positioned on the left side of the vehicle.

SUMMARY OF THE INVENTION

The present invention provides the art with a system including an orientation device which is capable of automatically aligning the top mount in the first position for the right side of the vehicle and in the second position for the left side of the vehicle. The system includes tooling which includes a first stationary stop for the right side of the vehicle and a second spring mounted stop for the left side of the vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
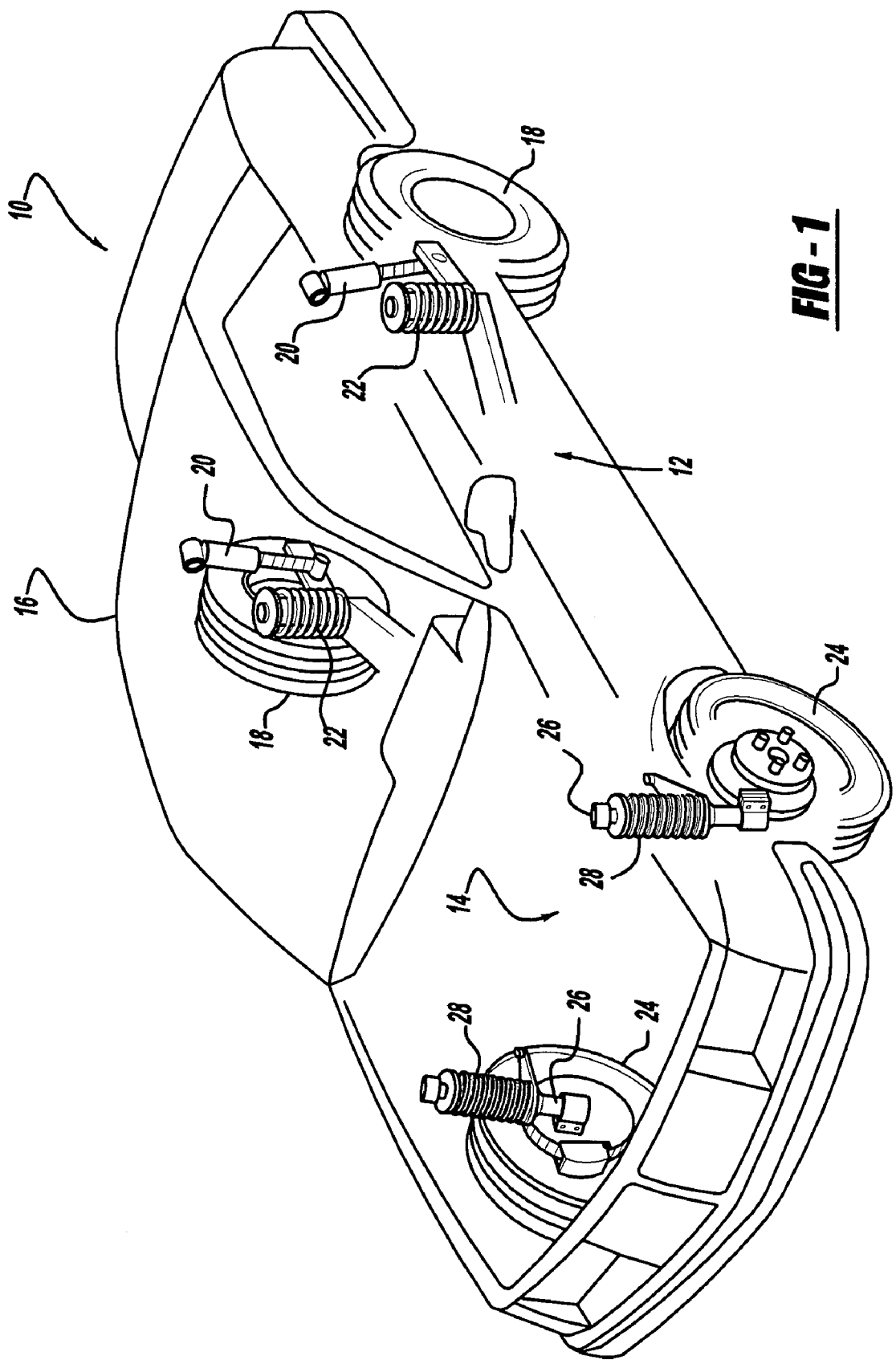
FIG. 1 is an illustration of an automobile using the McPherson strut assemblies in accordance with the present invention.

There is shown in FIG. 1 a vehicle incorporating a suspension system having the strut assembly in accordance with the present invention and which is designated generally by the reference numeral 10. Vehicle 10 comprises a rear suspension 12, a front suspension 14 and a body 16. Rear suspension 12 has a transversely extending rear axle assembly (not shown) adapted to operatively support the vehicle's rear wheels 18. The rear axle assembly is operatively connected to body 16 by means of a pair of shock absorbers 20 and a pair of helical coil springs 22. Similarly front suspension 14 includes a transversely extending front axle assembly (not shown) to operatively support the vehicle's front wheels 24. The front axle assembly is operatively connected to body 16 by means of a second pair of shock absorbers 26 and by a pair of shaped helical coil springs 28. Shock absorbers 20 and 26 serve to dampen the relative motion of the unsprung portion (i.e. front and rear suspensions 12 and 14, respectively) and the sprung portion (i.e. body 16) of vehicle 10. While vehicle 10 has been depicted as a passenger car having front and rear axle assemblies, shock absorbers 20 and 26 may be used with other types of vehicles and/or in other types of applications such as vehicles incorporating independent front and/or independent rear suspension systems. Further, the term "shock absorber" as used herein is meant to be dampers in general and thus will include McPherson struts. Also, while front suspension 14 is illustrated having a pair of McPherson struts or shock absorbers 26, it is within the scope of the present invention to have rear suspension 12 incorporate a pair of McPherson struts or shock absorbers 26 if desired.

Figure 2:
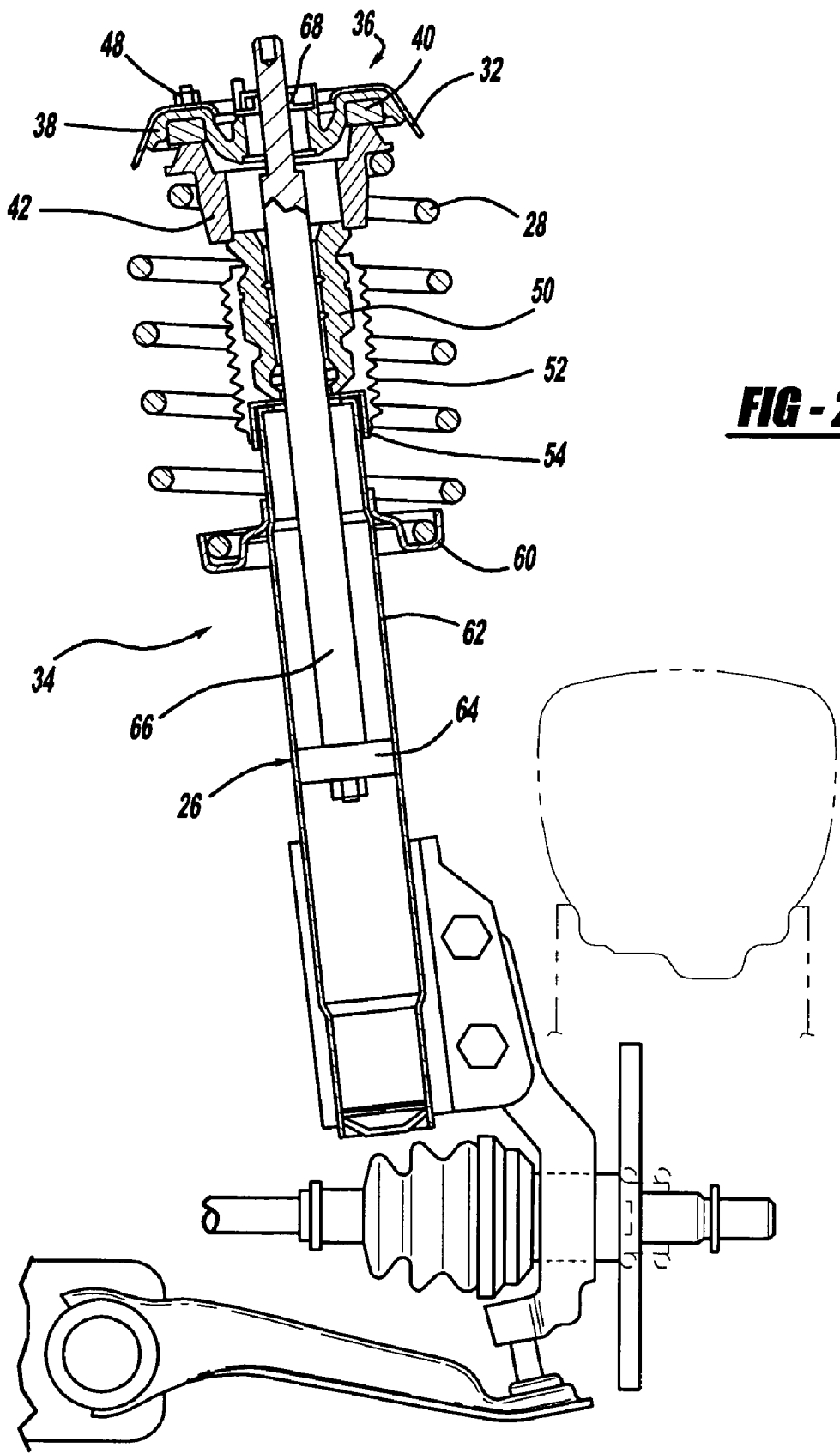
FIG. 2 is a side view of one of the front suspension units that incorporate the McPherson strut assembly in accordance with the present invention.

Referring now to FIG. 2, the front wheel assembly for vehicle 10 is illustrated in greater detail. Body 16 defines a shock tower 32 comprising sheet metal of vehicle 10 within which is mounted a McPherson strut assembly 34 which comprises a telescoping device in the form of shock absorber 26, coil spring 28 and a top mount assembly 36. McPherson strut assembly 34 including shock absorber 26, coil spring 28 and top mount assembly 36 are attached to vehicle 10 using shock tower 32. Top mount assembly 36 comprises a top mount 38, a bearing assembly 40 and an upper spring seat 42. Top mount 38 comprises an integral molded body and a rigid body member, typically made of stamped steel. Top mount assembly 36 is mounted to body 16 by bolts 48. Bearing assembly 40 is friction fit within the molded body of top mount 38 to be seated in top mount 38 so that one side of bearing assembly 40 is fixed relative to top mount 38 and shock tower 32. The second side of bearing assembly freely rotates with respect to the first side of bearing assembly 40, top mount 38 and shock tower 32.

The free rotating side of bearing assembly 40 carries upper spring seat 42 that is clearance fit to the outer diameter of bearing assembly 40. A jounce bumper 50 is disposed between upper spring seat 42 and shock absorber 26. Jounce bumper 50 comprises an elastomeric material which is protected by a plastic dirt shield 52. A bumper cap 54 is located on shock absorber 26 to interface with jounce bumper 50 and plastic dirt shield 52.

A lower spring seat 60 is attached to shock absorber 26 and coil spring 28 is disposed between upper spring seat 42 and lower spring seat 60 to isolate body 16 from front suspension 14. Shock absorber 26 comprises a pressure tube 62, a piston assembly 64 and a telescoping rod or piston rod 66. While shock absorber 26 is illustrated as a mono-tube design, it is within the scope of the present invention to utilize a dual-tube shock absorber for shock absorber 26. Also, while shock absorber 26 is illustrated in FIG. 2, it is to be understood that shock absorber 20 may also include the features described herein for shock absorber 26.

Prior to the assembly of McPherson strut assembly 34 into vehicle 10, the pre-assembly McPherson strut assembly 34 is performed. Bumper cap 54, jounce bumper 50 and dirt shield 52 are assembled to shock absorber 26. Coil spring 28 is assembled over shock absorber 26 and positioned within lower spring seat 60. Upper spring seat 42 is assembled onto shock absorber 26 and correctly positioned with respect to coil spring 28. Bearing assembly 40 is positioned on top of upper spring seat 42 and top mount 38 is positioned on top of bearing assembly 40. This entire assembly is positioned within an assembly machine which compresses coil spring 28 such that the end of piston rod 66 extends through a bore located within top mount assembly 36. A retaining nut 68 is threadingly received on the end of piston rod 66 to secure the assembly of McPherson strut assembly 34.

Top mount 38 is designed as an identical component for the right and left hand sides of the vehicle but it has a different orientation with respect to shock absorber 26 and its associated bracketry when it is placed on the right or left side of the vehicle.

Figure 3:
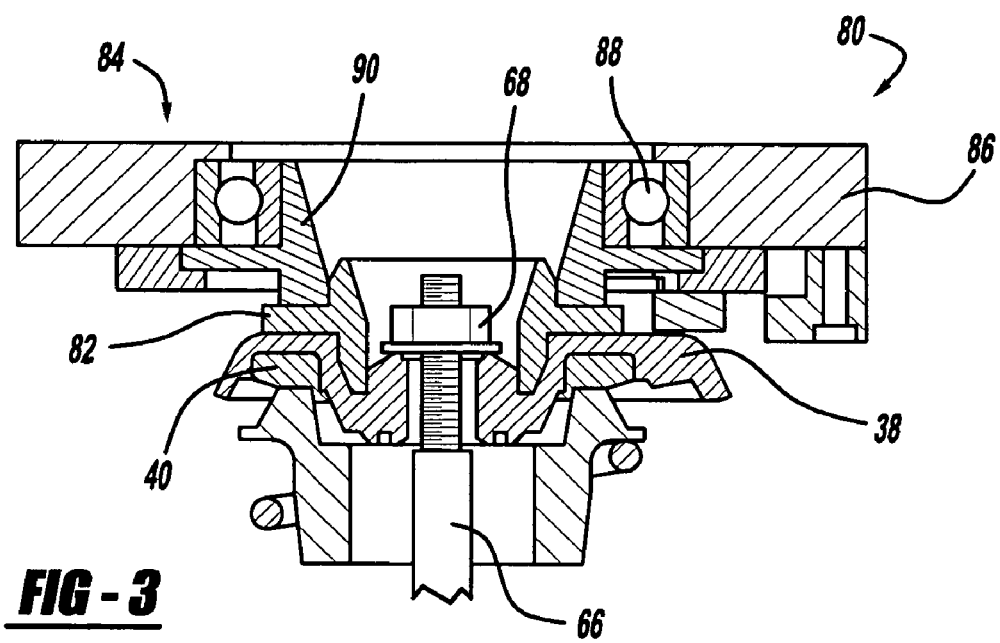
FIG. 3 is an enlarged cross sectional view of the top mount assembly of the present invention with the orientation tooling engaged with the top mount.
Figure 4:
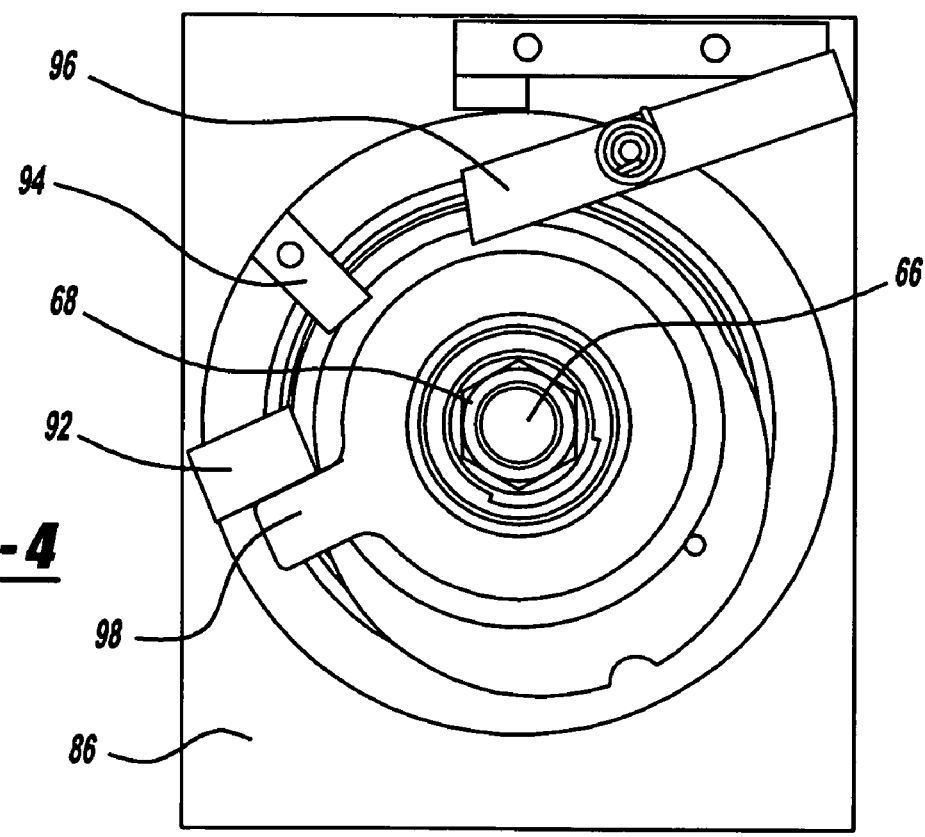
FIG. 4 is a top view of the top mount assembly and the orientation tooling illustrated in FIG. 3.

Referring now to FIGS. 3 and 4, an orientation device in the form of tooling 80 which automatically orientates top mount 38 is illustrated. Tooling 80 comprises a top mount fixture 82 and an upper tool 84 which compresses a base plate 86, a bearing 88 and a guide 90. Guide 90 is rotatably disposed within an opening defined by base plate 86 with bearing 88 being disposed between guide 90 and base plate 86.

Top mount 38 is engaged by top mount fixture 82. Top mount 38 with top mount fixture 82 is positioned within upper tool 84 with top mount fixture 82 engaging guide 90. Bearing 88 is disposed between guide 90 and base plate 86 to permit rotation of top mount 38, top mount fixture 82 and guide 90 with respect to base plate 86 in order to properly orientate top mount 38 with respect to shock absorber 26. Base plate 86 includes a blocking stop 92, a first position stop 94 and a second position stop 96. A positioning member 98 which is a part of top mount fixture 82 engages stops 92, 94 and 96 to properly orientate top mount 38 with respect to shock absorber 26.

During assembly of McPherson strut assembly 34 and the torquing of retaining nut 68, positioning member 98 engages blocking stop 92 to prohibit rotation of top mount 38 until the proper torque for retaining nut 68 is achieved. Once the assembly is completed and retaining nut 68 is tightened, top mount 38 is orientated in a counter-clockwise direction as illustrated in FIG. 4. Top mount 38 and top mount fixture 82 are rotated counter-clockwise until positioning member 98 engages first position stop 94. Second position stop 96 is a spring mounted position stop which moves out of the way of positioning member 98 when it moves counter-clockwise but second position stop 96 will act as a stop for positioning member 98 when it is rotated clockwise as shown in FIG. 4. If positioning member 98 engaging first position stop 94 is the correct orientation for top mount 38 for its position in the vehicle such as the right side of the vehicle, control on the amount of torque for retaining nut 68 and a positional control are completed and the assembly process is complete. If the rotation of top mount 38 and top mount fixture 82 to its position where positioning member 98 engages first position stop 94, is not the correct position, such as the left side of the vehicle, top mount 38 and top mount fixture 82 are rotated clockwise until second position stop 96 is engaged which is the correct position for the opposite orientation of top mount 38. The control for the torque on retaining nut 68 and a positional control are completed and the assembly process is complete.

While tooling 80 is illustrated as having blocking stop 92 and first and second position stops 94 and 96, it is within the scope of the present invention to have additional spring supported mechanical stops which can be combined with the angular rotation command of the nut runner to provide additional final position stops if desired.

The description of the invention is merely exemplary in nature and, thus, variations that do not depart from the gist of the invention are intended to be within the scope of the invention. Such variations are not to be regarded as a departure from the spirit and scope of the invention.

If the design of the top mount allows to use one or more parts of the top mount to fulfill the function of positioning member 98 in one or more steps of the process, this considerably simplifies the set-up. This application is considered as within the scope of this invention.

What is claimed is:

1. An orientation device for a strut assembly comprising:
an upper tool having a base plate and a guide rotatably secured to said base plate, said base plate defining a blocking stop and a first position stop;
a top mount fixture in engagement with said guide, said guide defining a positioning member; said top mount fixture being adapted to engage a top mount of said strut assembly; wherein
said positioning member engages said blocking stop to prohibit rotation of said guide when said top mount fixture is rotated in a first direction to facilitate torquing of a retaining nut of said strut assembly; and
said positioning member engages said first position stop to prohibit rotation of said guide when said top mount fixture is rotated in a second direction opposite to said first direction to properly orientate said top mount of said strut assembly at a first position.

2. The orientation device for a strut assembly according to claim 1, wherein said upper tooling defines a second position stop, said positioning member engaging said second position stop to orientate said top mount of said strut assembly at a second position.

3. The orientation device for a strut assembly according to claim 2, wherein said second position stop is a one-way stop which only engages said positioning member when said top mount fixture is rotated in one of said first and second directions.

4. The orientation device for a strut assembly according to claim 1, wherein said upper tool comprises:
   a bearing disposed between said base plate and said guide.

5. The orientation device for a strut assembly according to claim 4, wherein said base plate defines a second position stop, said positioning member engaging said second position stop to orientate said top mount of said strut assembly at a second position.

6. The orientation device for a strut assembly according to claim 5, wherein said second position stop is a one-way stop which only engages said positioning member when said top mount fixture is rotated in one of said first and second directions.

7. An orientation device for a strut assembly comprising:
   an upper tool defining a blocking stop and a first position stop;
   a top mount fixture in engagement with said upper tool, said top mount fixture defining a positioning member;
   said top mount fixture being adapted to engage a top mount of said strut assembly; wherein
   said positioning member engages said blocking stop when said top mount fixture is rotated in a first direction to facilitate torquing of a retaining nut of said strut assembly;
   said positioning member engages said first position stop when said top mount fixture is rotated in a second direction opposite to said first direction to properly orientate said top mount of said strut assembly at a first position;
   said upper tooling defines a second position stop, said positioning member engaging said second position stop to orientate said top mount of said strut assembly at a second position; and
   said second position stop is a spring loaded stop.

8. The orientation device for a strut assembly according to claim 7, wherein said second position stop is a one-way stop which only engages said positioning member when said top mount fixture is rotated in one of said first and second directions.

9. An orientation device for a strut assembly comprising:
   an upper tool defining a blocking stop and a first position stop;
   a top mount fixture in engagement with said upper tool, said top mount fixture defining a positioning member;
   said top mount fixture being adapted to engage a top mount of said strut assembly; wherein
   said positioning member engages said blocking stop when said top mount fixture is rotated in a first direction to facilitate torquing of a retaining nut of said strut assembly;
   said positioning member engages said first position stop when said top mount fixture is rotated in a second direction opposite to said first direction to properly orientate said top mount of said strut assembly at a first position;
   said upper tooling defines a second position stop, said positioning member engaging said second position stop to orientate said top mount of said strut assembly at a second position; and
   said upper tool comprises:
   a base plate defining said blocking stop and said first position stop;
   a guide rotatably disposed within an opening defined by said base plate; and
   a bearing disposed between said base plate and said guide; wherein
   said second position stop is a spring loaded stop.

10. The orientation device for a strut assembly according to claim 9, wherein said second position stop is a one-way stop which only engages said positioning member when said top mount fixture is rotated in one of said first and second directions.

11. A method of orientating a top mount of a strut assembly, the method comprising:
   engaging said top mount with a top mount fixture;
   rotating said top mount using said top mount fixture in a first direction until a blocking stop is engaged to prohibit the rotating of the top mount;
   rotating said top mount in a second direction opposite to said first direction after said blocking stop is engaged until a first position stop is engaged to prohibit the rotating of the top mount; and
   disengaging said top mount fixture from said top mount.

12. The method of orientating a top mount of a strut assembly according to claim 11 further comprising:
   locating said blocking stop and said first position stop on an upper tool; and
   engaging said top mount fixture with said upper tool prior to rotating said top mount using said top mount fixture.

13. The method of orientating a top mount of a strut assembly according to claim 11 further comprising rotating said top mount in the first direction until a second position stop is engaged after rotating said top mount in said second direction.

14. The method of orientating a top mount of a strut assembly according to claim 13 further comprising:
   locating said blocking stop and said first and second position stops on an upper tool; and
   engaging said top mount fixture with said upper tool prior to rotating said top mount using said top mount fixture.

* * * * *